(12) United States Patent
Chuang et al.

(10) Patent No.: US 9,979,189 B2
(45) Date of Patent: May 22, 2018

(54) CONTROL APPARATUS USING VARIATIONS IN CONDUCTION ANGLE AS CONTROL COMMAND

(71) Applicant: Jaguar Precision Industry Co., Ltd., New Taipei (TW)

(72) Inventors: Fei-Tyh Chuang, New Taipei (TW); Zhen-Gong Xie, Taoyuan County (TW)

(73) Assignee: Jaguar Precision Industry Co., Ltd., Shu-Lin District, New Taipei (TW)

( * ) Notice: Subject to any disclaimer, the term of this patent is extended or adjusted under 35 U.S.C. 154(b) by 163 days.

(21) Appl. No.: 15/016,470

(22) Filed: Feb. 5, 2016

(65) Prior Publication Data

US 2016/0233671 A1   Aug. 11, 2016

(30) Foreign Application Priority Data

Feb. 6, 2015   (TW) .............................. 104104044 A

(51) Int. Cl.

| | |
|---|---|
| H02J 3/14 | (2006.01) |
| H02J 1/00 | (2006.01) |
| H05B 37/02 | (2006.01) |
| H05B 39/08 | (2006.01) |
| H05B 41/392 | (2006.01) |
| H02M 7/06 | (2006.01) |

(52) U.S. Cl.
CPC ................ *H02J 1/00* (2013.01); *H02M 7/06* (2013.01); *H05B 37/0245* (2013.01); *H05B 39/08* (2013.01); *H05B 41/3924* (2013.01)

(58) Field of Classification Search
None
See application file for complete search history.

(56) References Cited

U.S. PATENT DOCUMENTS

| | | | |
|---|---|---|---|
| 5,422,547 A | 6/1995 | Brownell | 315/396 |
| 5,955,794 A | 9/1999 | Schulz | 307/127 |

(Continued)

FOREIGN PATENT DOCUMENTS

| | | |
|---|---|---|
| CN | 101998734 A | 3/2011 |
| CN | 103384433 A | 11/2013 |

(Continued)

OTHER PUBLICATIONS

Search Report EP 2858460A1, dated Jun. 22, 2016, EP.

(Continued)

*Primary Examiner* — Lincoln Donovan
*Assistant Examiner* — Khareem E Almo
(74) *Attorney, Agent, or Firm* — Bui Garcia-Zamor; Jessica H. Bui, Esq.

(57) ABSTRACT

A control apparatus using variations in conduction angle as control command, wherein a conduction angle modulation module of a traditional leading edge cutoff dimmer is arranged in parallel with a resistance module, so as to enlarge the minimum conduction angle of the leading edge dimmer. The modulation range of the conduction angle of the conduction angle modulation module may be set to a smaller range, so that the modulation range of the resistance module will not be uncertain due to different setting values of the variable resistance, whereby the circuit at load end can be identified readily and function mode switching facilitated to achieve the effect of multiplexing control.

20 Claims, 9 Drawing Sheets

(56) References Cited

U.S. PATENT DOCUMENTS

| | | | | |
|---|---|---|---|---|
| 6,114,813 | A | 9/2000 | Lo | 315/159 |
| 7,497,582 | B1 | 3/2009 | Savicki | 362/95 |
| 8,716,957 | B2 | 5/2014 | Melanson | 315/360 |
| 9,426,852 | B2* | 8/2016 | Zudrell-Koch | H05B 41/3924 |
| 2008/0224624 | A1 | 9/2008 | Richter | |
| 2009/0261744 | A1* | 10/2009 | Chen | H05B 41/3925 |
| | | | | 315/199 |
| 2012/0049752 | A1 | 3/2012 | King | 315/210 |
| 2012/0235591 | A1 | 9/2012 | Jackson | |
| 2012/0280629 | A1* | 11/2012 | Gaknoki | H05B 33/0815 |
| | | | | 315/186 |
| 2012/0326616 | A1* | 12/2012 | Sumitani | H05B 33/0815 |
| | | | | 315/201 |
| 2014/0021874 | A1* | 1/2014 | Chen | H05B 33/0815 |
| | | | | 315/200 R |
| 2014/0042922 | A1* | 2/2014 | Wu | H05B 33/0818 |
| | | | | 315/201 |
| 2014/0063857 | A1* | 3/2014 | Peng | H05B 33/0815 |
| | | | | 363/16 |
| 2014/0217918 | A1* | 8/2014 | Knoedgen | H05B 33/0815 |
| | | | | 315/224 |
| 2014/0347894 | A1* | 11/2014 | Sutardja | H05B 33/0815 |
| | | | | 363/21.12 |
| 2015/0237694 | A1* | 8/2015 | Zudrell-Koch | H05B 33/0815 |
| | | | | 315/307 |
| 2015/0237700 | A1* | 8/2015 | Woytowitz | H05B 33/0863 |
| | | | | 315/307 |
| 2015/0349625 | A1* | 12/2015 | Hyoung | H02M 1/4208 |
| | | | | 363/46 |
| 2015/0366010 | A1* | 12/2015 | Mao | H05B 33/0815 |
| | | | | 315/223 |
| 2016/0233671 | A1* | 8/2016 | Chuang | H02J 1/00 |
| 2017/0086281 | A1* | 3/2017 | Avrahamy | H05B 37/0272 |
| 2017/0150569 | A1* | 5/2017 | Hayashi | H05B 33/0851 |

FOREIGN PATENT DOCUMENTS

| | | |
|---|---|---|
| CN | 104303601 A | 1/2015 |
| DE | 102007059789 B3 | 6/2009 |
| EP | 2858460 | 8/2015 |
| TW | 201433078 A | 8/2014 |
| TW | 201444405 A | 11/2014 |
| TW | WO2015061954 A1 | 5/2015 |
| WO | WO 2011114250 A1 | 9/2011 |
| WO | WO2015061950 A1 | 5/2015 |

OTHER PUBLICATIONS

Australian Patent Examination Report Appl. No. 2016200365, dated Oct. 27, 2016, AU.
Search Report 104104044, dated Feb. 2, 2016, TW.
Office Action 104104044, dated Feb. 2, 2016, TW.

* cited by examiner

CONTROL APPARATUS USING VARIATIONS IN CONDUCTION ANGLE AS CONTROL COMMAND

BACKGROUND OF THE INVENTION

Field of the Invention

The invention relates to a control apparatus using variations in conduction angle as control command, particularly to a control apparatus applicable to DC (Direct Current) inverter motor, lamp, heater or other appliance apparatus.

Brief Description of the Related Art

A traditional leading edge cutoff phase control dimmer (known as TRIAC dimmer) controls energy transferred to load by adjusting conduction angle of alternating current. However, minimum conduction angle usually has to approximate to zero degree for deep dimming, such that power factor is reduced and electronic load operates abnormally.

Referring to FIG. 1A, which is a circuit structure diagram showing a conventional TRIAC dimmer. As shown in the figure, basic elements of the circuit include an AC (Alternating Current) power supply AC, a variable resistance R1, a fixed resistance R2, a capacitor C1, a diode thyristor DIAC, a triode thyristor TRIAC and a load LOAD. Wherein, the RC circuit consisting of the variable resistance R1, the fixed resistance R2 and the capacitor C1 may postpone activation of the TRIAC dimmer until the voltage of the capacitor C1 rises to the trigger voltage of the diode thyristor DIAC.

In other words, after electric supply is connected, current will flow through the variable resistance R1 and the fixed resistance R2, followed by flowing into and charging the capacitor C1. After the voltage of the capacitor C1 reaches the trigger voltage of the diode thyristor DIAC, the diode thyristor DIAC is conducted, and then, the triode thyristor TRIAC is triggered for conduction and starts to supply power to light source. In the following, the variable resistance R1, the fixed resistance R2, and the connection of the variable resistance R1 and the fixed resistance R2 are referred to as "conduction angle modulation module" collectively.

Furthermore, refer to both FIG. 1B and FIG. 1C. FIG. 1B shows a full sinusoidal voltage waveform on input end. FIG. 1C shows a voltage waveform on two ends of the light source after being chopped by the TRIAC dimmer. Wherein, as the variable resistance R1 is modulated such that a slider slides downwards further, the resistance of the variable resistance R1 becomes larger, the current flowing through the capacitor C1 is reduced, the voltage across the capacitor C1 will reach the trigger voltage of the diode thyristor DIAC slower, and the triode thyristor TRIAC will be triggered slower for conduction, such that the chopped portion of the input sine wave voltage results in reduced energy supplied to the light source (luminance is reduced), as shown in FIG. 1C. In brief, larger resistance of the variable resistance R1 results in smaller conduction angle $\theta$, smaller electricity supplied to the light source, and less luminance, so that the power factor is getting lower and lower.

Further, for the structure and function of the traditional leading edge cutoff phase control dimmer (also referred to as small conduction angle dimmer) as described above, the conduction angle of the dimmer may be changed by sizing the variable resistance R1, or sum of the variable resistance R1 and the fixed resistance R2, such that the delay time for activating the TRIAC dimmer may be adjusted. Wherein, the main function of the fixed resistance R2 is to keep a basic resistance as the variable resistance R1 is adjusted to 0 ohm in order to prevent excessive current, which can damage the capacitor C1, from flowing to the capacitor C1. Certainly, the resistance of the fixed resistance R2 may also influence the conduction angle of the dimmer. However, as the variable resistance R1 is adjusted to the maximum value, the delay time for activating the TRIAC dimmer is the longest, and the conduction angle is the minimum and is close to 0, so that such dimmer is referred to as small conduction angle dimmer, which results in lower power factor and abnormal operation of electronic load in deep dimming.

However, for lower power factor of conventional technology due to small conduction angle, the applicant has proposed improved solutions of new concepts and has applied for patents thereof, such as PCT application No. PCT/CN2013/086093, titled "Method for Controlling and Operating Load by Using Control Command of Changing Conduction Angle of AC Voltage and Adjustment and Control Apparatus thereof", and PCT application No. PCT/CN2013/086087, titled "Control Apparatus for DC Variable Frequency Motor", which use conduction angle as control command essentially, rather than simple control for transfer of excessive energy. Thereby, the minimum conduction angle may be controlled to be larger than 120 degrees in normal operation (referred to as large conduction angle dimmer), so that the issue of lower power factor when traditional TRIAC dimmer is used described above may be overcome, electronic load may be protected from abnormal operation due to excessively small conduction angle, and control of multiple functions is available by using different phase commands.

Additionally, there are many commercially available traditional dimmer products. That is, light bulbs or motors are driven by using traditional dimmers. However, in the case that traditional dimmers may be modified to new dimmers of large conduction angle, or large conduction angle dimmers may be switched to traditional small conduction angle dimmers when loads of traditional dimmers are used, the products may become more convenient and more popular, and are of urgent needs in industries.

SUMMARY OF THE INVENTION

A main objective of the invention is to provide a control apparatus, for which a conduction angle modulation module of a traditional leading edge cutoff dimmer in parallel with a resistance module is used to enlarge the minimum conduction angle of the leading edge dimmer, so that the conduction angle is varied as a control command, such that the modulation range for the conduction angle of the variable resistance may be set to be smaller. When an always on push-button switch is used in conjunction, pressing the button to open the always on push-button switch for multiplexing control will not result in uncertainty of the modulation range of the resistance module due to different setting values of the variable resistance, whereby the circuit at load end can be identified readily and of the function mode switching facilitated to achieve the effect of multiplexing control.

To achieve the above objective, the present invention provides a control apparatus using variations in conduction angle as control command for cutting off a conduction angle of an AC power supply to act as a control command for controlling one or more loads. The control apparatus includes a conduction angle modulation module for setting the conduction angle of the AC power supply; and a resistance module arranged in parallel with the conduction angle modulation module, the resistance module may diminish the modulation range of the conduction angle used as the control command.

In the present invention, the variation range of the AC conduction angle modulated by the conduction angle modulation module may be set to be within a smaller range by means of the resistance module arranged in parallel with the conduction angle modulation module, so that not only the low power defect found in traditional leading edge cutoff dimmer may be overcome, but also the abnormal operation of the electronic load due to excessively small conduction angle may be precluded. According to the present invention, the conduction angle modulation module may be used to set the conduction angle of the AC power supply by means of a variable resistance, but is not limited thereto. A fixed resistance with fixed resistivity, a fixed resistance and a variable resistance in combination, or other equivalent elements or apparatus that are capable of setting or modulating the conduction angle of the AC power supply may be applied, and the number of quantity is not limited.

Additionally, the resistance module may short out the conduction angle modulation module instantly through appropriate means, and the capacitor is charged/discharged solely by the resistance module. At this instant, the conduction angle is smaller than the conduction angle under the condition that the conduction angle modulation module is in the on state. Besides, as the resistance of the resistance module is fixed, the conduction angle is also fixed. As such, uncertainty in the modulation range due to different setting values of the resistance will not occur. Therefore, the circuit at load end can be easily used to interpret the conduction angle, and the switching of function modes can be readily arranged, thereby achieving the effect of multiplexing control.

The resistance module according to the present invention may further comprise a first resistance and a first switch, with the first switch coupled to the first resistance at one end, and to the conduction angle modulation module at the other end. The first switch can be a change-over switch, and may be connected in series with the first resistance, and is connected in parallel with the conduction angle modulation module with the first resistance in combination. Accordingly, the resistance module of the present invention may enable/disable the operation of the first resistance by the provision of the first switch. In other words, the control apparatus of the present invention may be arranged to switch between a modulation range of a large conduction angle set simply by the conduction angle modulation module and, a modulation range of a smaller conduction angle after resistances are connected in parallel therewith, and therefore, may be applicable to various load situations of large conduction angle dimmer formed by the control apparatus of this invention and small conduction angle dimmer of traditional leading edge cutoff dimmer.

The resistance module of the present invention may further include at least one second resistance and at least one second switch, and the at least one second switch may also be a change-over switch. Moreover, the at least one second resistance is connected in series with the at least one second switch, and connected in parallel with the conduction angle modulation module, and the second switch is connected in parallel with the first resistance and the first switch. Accordingly, the minimum conduction angle of the control apparatus may be varied by making different settings on the first switch and the second switches.

Moreover, the first switch of the present invention may also be a first always on push-button switch. One end of the first resistance and the conduction angle modulation module are coupled to a gate terminal of a thyristor, and the other end of the first resistance and the conduction angle modulation module are coupled to an anode terminal of the thyristor. The first always on push-button switch is disposed between the one end of the first resistance and the one end of the conduction angle modulation module that are coupled to the gate terminal of the thyristor. Accordingly, the conduction angle modulation module may be short out temporarily by pressing the first always on push-button switch, and the conduction angle is determined by the fixed resistance temporarily and changed to a certain fixed value regardless of the setting of the conduction angle modulation module, and thereby good for multiplexing control. It is noted particularly that, the thyristor mentioned in the invention may include a triode thyristor (TRIAC), a silicon controlled rectifier (SCR), a diode thyristor (DIAC), and other equivalents.

Preferably, the first resistance is arranged between the conduction angle modulation module and the thyristor. Moreover, the resistance module may further include at least one second always on push-button switch and at least one second resistance, and the at least one second resistance and the first resistance are connected in parallel with each other, and the at least one second resistance may be arranged between the first resistance and the thyristor. Further, at least one second always on push-button switch may be provided between the first resistance and the second resistance, or between two of the second resistances arranged adjacent to each other, and may be coupled with the first always on push-button switch. Accordingly, pressing on different always on push-button switches would allow the conduction angle to correspond to respective fixed values for multiplexing control.

Furthermore, the resistance module in the present invention may further include a mode switching switch. The first resistance is arranged to connect with the at least one second resistance in parallel, and then connect with the mode switching switch in series, and subsequently connect with the end of the conduction angle modulation module that is not coupled to the first always on push-button switch in parallel. Accordingly, it is possible to make switches between the large conduction angle dimmer formed by the control apparatus of the present invention and the small conduction angle dimmer of the conventional leading edge cutoff dimmer by turning on/off the mode switching switch.

Also, the load may include a phase detection circuit and a zero-crossing detection circuit. The phase detection circuit may be electrically connected to the control apparatus. The phase detection circuit is used to detect conduction angle of the AC power supply after cutoff by the control apparatus; and the zero-crossing detection circuit is used to detect zero of the AC power supply. Further, the present invention may use the zero-crossing detection circuit directly to detect zero and conduction angle simultaneously. That is, the zero-crossing detection circuit and the conduction angle detection circuit may be integrated or exist separately.

Additionally, the load may further include at least one control unit and at least one electrical appliance. The control unit is electrically connected to the phase detection circuit and the electrical appliance; wherein, the control unit controls the electrical appliance according to the detected conduction angle of the AC power supply cut off by the control apparatus. Nevertheless, the electrical appliance may be a DC inverter motor, lamp, heating apparatus, and/or other appliances or electronic elements.

Preferably, the invention may interpret the setting of the control command by means of the control unit, and the conduction angle with phase in transient state variation or the conduction angle with phase in long period steady state may be used as the conduction angle for the control command. In particular, when it is desired to change the states of one or more loads, the control apparatus cuts off the conduction angle of an AC power supply as the control command for controlling the one or more loads. The conduction angle is restored immediately as soon as the control command has been given. In this respect, the conduction angle with phase in transient state variation is used as the control command. On the other hand, if the control apparatus continuously cut off the conduction angle of the AC power supply as the control command for controlling one or more loads until the next change in state of load, the conduction angle used as the control command here may be referred to as the conduction angle with phase in long period steady state.

DETAILED DESCRIPTION OF THE PREFERRED EMBODIMENTS

Figure 1A:
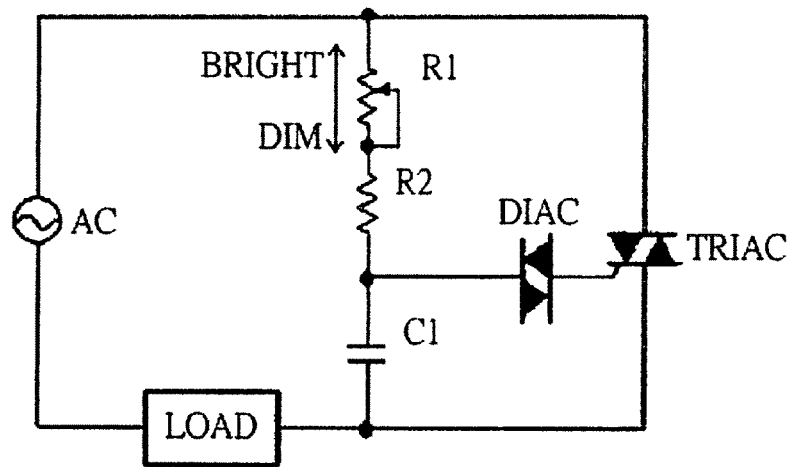
FIG. 1A shows a circuit construction diagram of a conventional TRIAC dimmer.
Figure 1B:
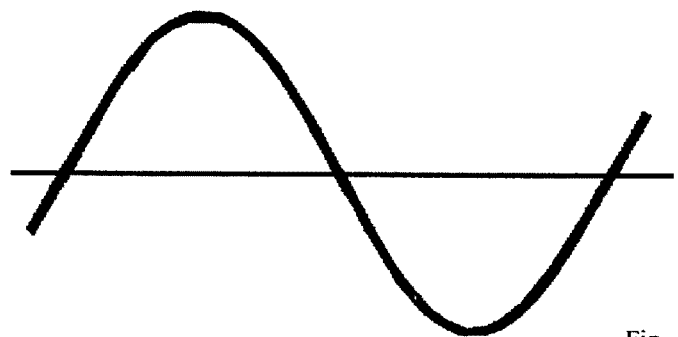
FIG. 1B shows a waveform diagram of the conduction angle modulated by a conventional control module.
Figure 1C:
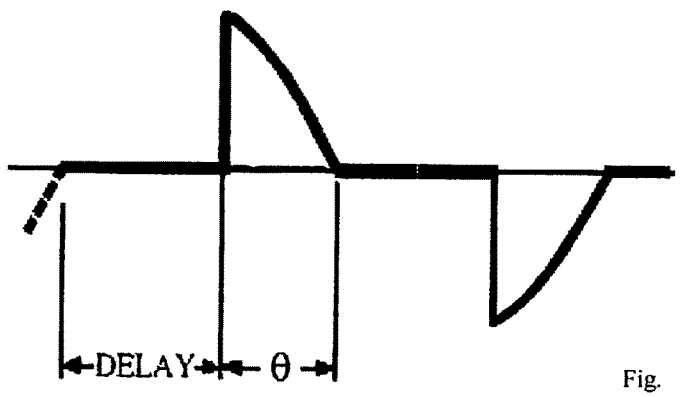
FIG. 1C shows a voltage waveform after modulation by a conventional TRIAC dimmer.

In the descriptions which follows, like are marked throughout the specification and drawings with the same reference numerals.

Figure 2:
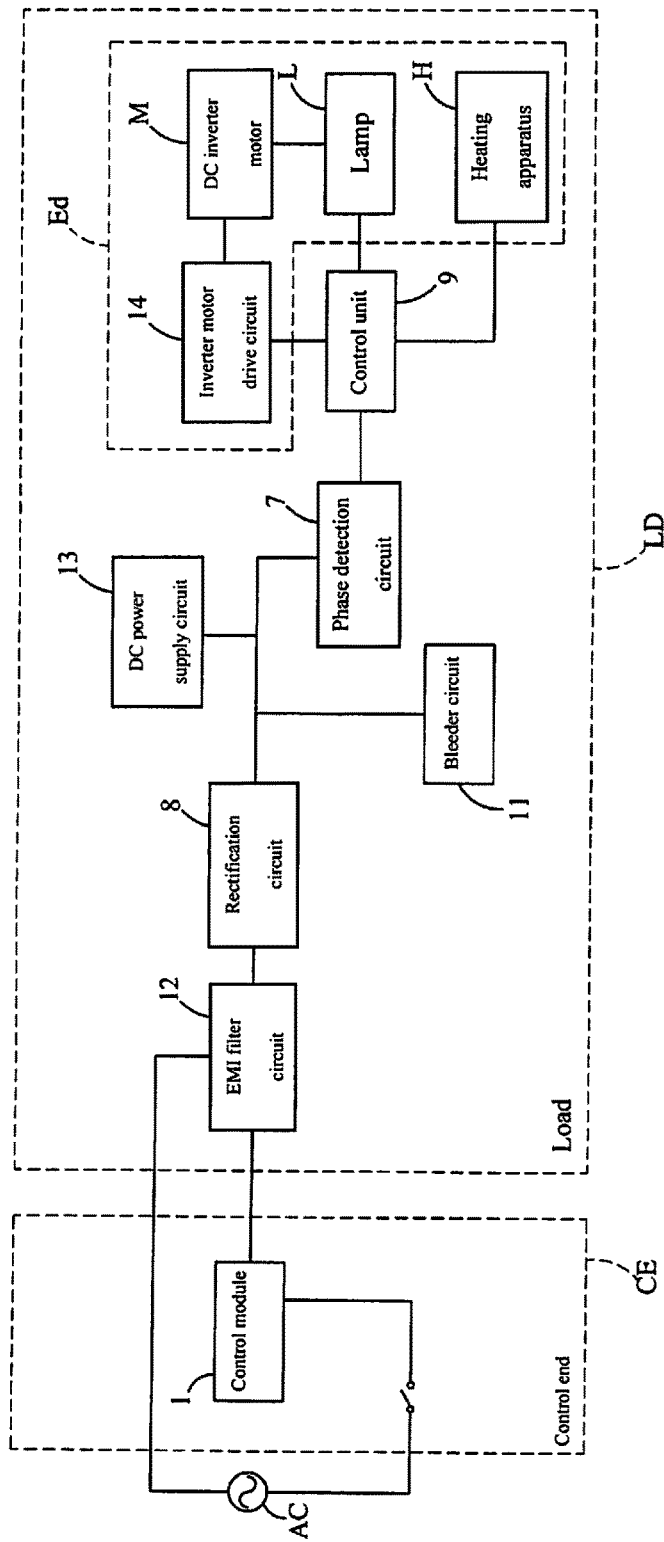
FIG. 2 is a block diagram of a preferred exemplary system of a control apparatus according to a first preferred embodiment of the present invention.
Figure 3:
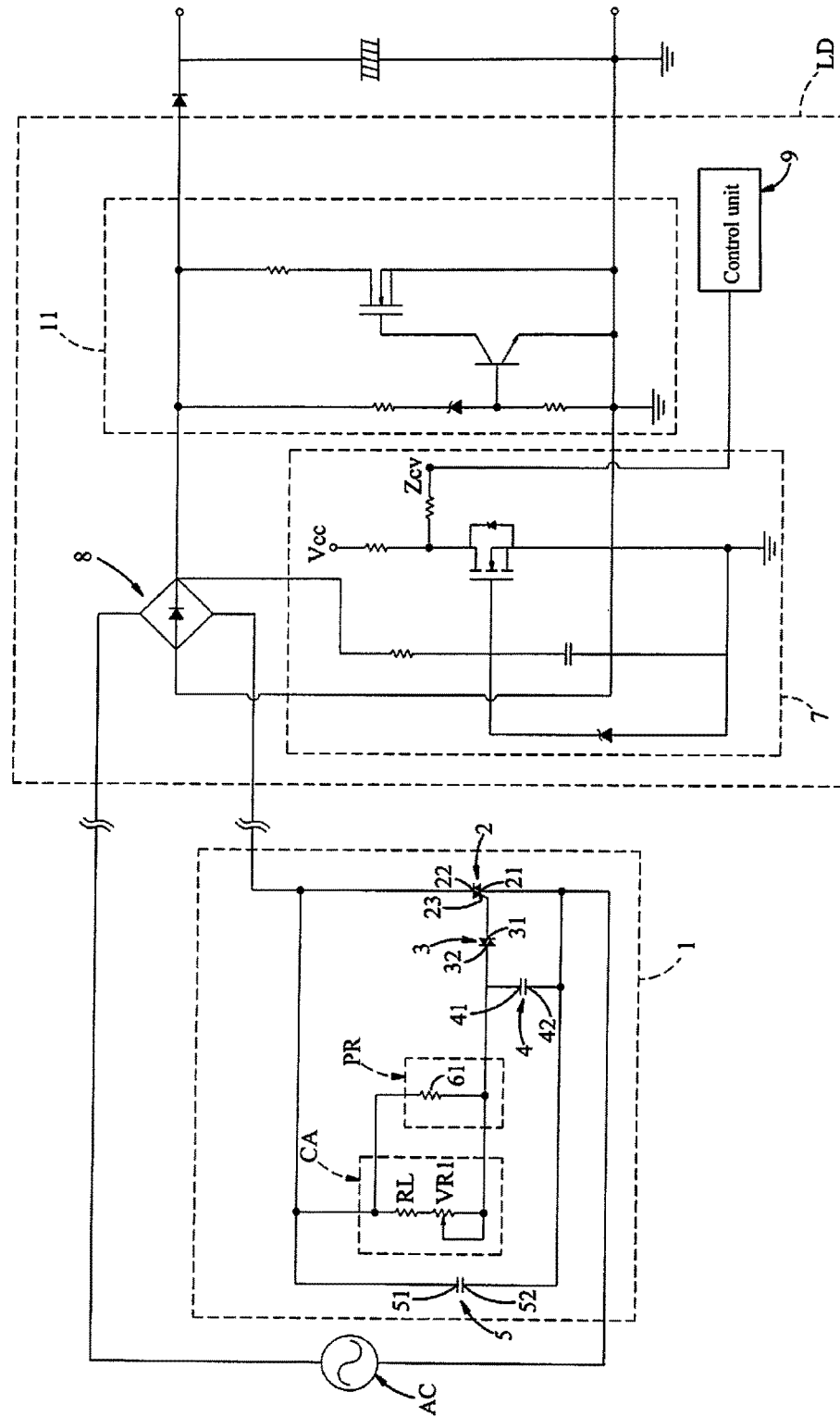
FIG. 3 is a circuit diagram of a preferred exemplary system of the control apparatus and a load according to the first preferred embodiment of the invention.

Referring to both FIGS. 2 and 3. FIG. 2 shows a block diagram of a preferred exemplary system of a control apparatus according to a first embodiment of the present invention. FIG. 3 shows a circuit diagram of a preferred exemplary system of the control apparatus 1 and a load LD according to the first embodiment of the present invention. As shown in FIG. 2, a preferred exemplary system of the control apparatus 1 includes a control terminal CE and a load LD. The control terminal CE includes essentially a control apparatus 1, and the load LD consists essentially of a rectification circuit 8, a bleeder circuit 11, a phase detection circuit 7, a control unit 9, an EMI filter circuit 12, a DC power supply circuit 13 and an electrical appliance Ed. The electrical appliance Ed in this embodiment comprises a DC inverter motor M, an inverter motor drive circuit 14, a heating apparatus H and a lamp L.

The control apparatus 1 is electrically connected to an AC power supply AC, and the control apparatus 1 continuously cut off the conduction angle of the AC power supply until different conduction angles of the AC power supply are cut off again when it is required to change the rotational speed or action of the DC inverter motor M, or to change the states of the heating apparatus H and the lamp L. The rectification circuit 8 is electrically connected to the control apparatus 1 of the control end CE via the EMI filter circuit 12 to rectify the cutoff alternating current AC. The bleeder circuit 11 is electrically connected to the rectification circuit 8, and provides the triode thyristor with adequate latching current and holding current, so as to prevent the triode thyristor from false firing, which would result in incorrect detection of conduction angle by the phase detection circuit.

The DC inverter motor M is driven by an inverter motor drive circuit 14, and the phase detection circuit 7 is electrically connected to the rectification circuit 8 and may be located before or after the rectification circuit to detect the conduction angle after cutoff. The phase detection circuit 7 is also electrically connected with the control unit 9 to provide the control unit 9 with information regarding conduction angle. As shown in FIG. 2, in this embodiment, a zero-crossing detection circuit also serves as a conduction angle detection circuit, which will compact the circuit and reduce the cost. As shown in the figures, a zero-crossing detection circuit which is composed of a metal oxide semiconductor field effect transistor (MOSFET) and a Zener diode is adopted in this embodiment. However, the present invention is not limited to the type as shown, as other types of zero-crossing detection circuit may also serve as the phase detection circuit 7 in the present invention.

The control unit 9 is electrically connected to the phase detection circuit 7 to control the DC inverter motor M, the lamp L and/or the heating apparatus H based on the conduction angle of the AC power supply AC detected by the phase detection circuit 7, which has been cutoff. To facilitate the description, this embodiment is described with reference only to the DC inverter motor M, the lamp L and the heating apparatus H to show that the present invention is capable of multiplexing control of various loads. However, the present invention is not limited to the above as control of other electrical appliances or electronic elements are applicable.

In the following, only the circuit of the control apparatus 1 in the first embodiment of the present invention will be described in detail. The descriptions regarding the circuits of the other load LD portion will be omitted as they are well known. As shown in FIG. 3, the control apparatus 1 includes a triode thyristor 2, a diode thyristor 3, a first capacitor 4, a second capacitor 5, a conduction angle modulation module CA and a resistance module PR. The triode thyristor 2 comprises two anode terminals and a gate 23. The two anode terminals comprise a first terminal 21 electrically connected to the AC power supply AC, and a second terminal 22 electrically connected to the rectification circuit 8 of the load LD.

The diode thyristor 3 comprises a first anode terminal 31 connected to the gate 23 of the triode thyristor 2, and a second anode terminal 32. The first capacitor 4 comprises a first end 41 and a second end 42. The first end 41 is electrically connected to the second anode terminal 32 of the diode thyristor 3, and the second end 42 is electrically connected to the first terminal 21 of the triode thyristor 2 and then to the AC power supply AC. The second capacitor 5 comprises a first end 51 electrically connected to the second terminal 22 of the triode thyristor 2, and a second end 52 electrically connected to the second end 42 of the first capacitor 4.

The conduction angle modulation module CA in this embodiment includes a variable resistance VR1 and a current limiting resistance RL connected in series with the variable resistance VR1. One end of the conduction angle modulation module CA is electrically connected to the second anode terminal 32 of the diode thyristor 3 and the first end 41 of the first capacitor 4, while the other end is electrically connected to the second terminal 22 of the triode thyristor 2. A variable resistance VR1 is used in this embodiment, but the present invention is not limited thereto. A fixed resistance, or a combination of a fixed resistance and a variable resistance may be used, and the quantity of the resistances is not restricted to one.

The resistance module PR includes a first resistance 61 which is located between the conduction angle modulation module CA and the diode thyristor 3. That is to say, the first resistance 61 is in parallel connection with the variable resistance VR1 and the current limiting resistance RL which are in series connection; wherein an end of the first resistance 61 is electrically connected to the second anode terminal 32 of the diode thyristor 3 and the first end 41 of the first capacitor 4, while the other end is electrically connected to the second terminal 22 of the triode thyristor 2.

The current limiting resistance RL is provided to limit the current flowing into the diode thyristor 3 when the variable resistance VR1 is adjusted to resistance of zero, in order to prevent the circuit or electronic elements from burnout due to overload current. In this embodiment, it is illustrated that the current limiting resistance RL is connected in series with the variable resistance VR1 before connected in parallel with the first resistance 61, but the present invention is not limited thereto. For example, the variable resistance VR1 may be in parallel connection with the first resistance 61 before connection with the current limiting resistance RL in series. In other words, the variable resistance 61 may be disposed between the conduction angle modulation module CA and the second terminal 22 of the triode thyristor 2; or alternatively, the current limiting resistance RL may be disposed between the resistance module PR and the second anode terminal 32 of the diode thyristor 3.

In this embodiment, the minimum conduction angle of conventional leading edge dimmer is enlarged by the arrangement wherein the conduction angle modulation module CA is connected in parallel with the first resistance 61, so that the modulation range of AC conduction angle modulated by the variable resistance VR1 may be set to be smaller. As such, not only the issue of low power factor may be improved effectively, but also the electronic load may be precluded from operating abnormally due to excessively small conduction angle.

Figure 4A:
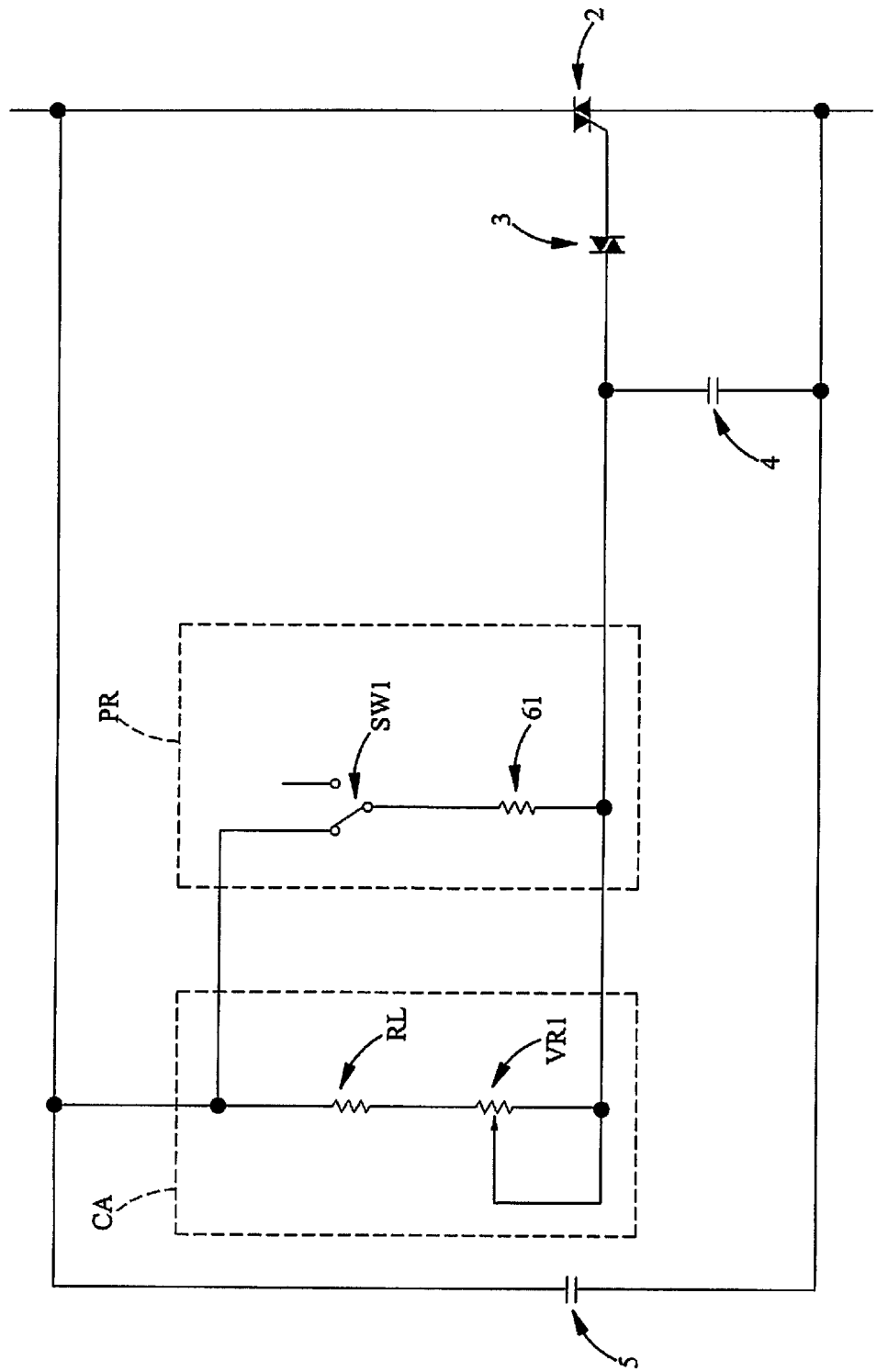
FIG. 4A is a circuit diagram of a control apparatus according to a second preferred embodiment of the present invention.

Referring to FIG. 4A which shows a circuit diagram of a control apparatus according to a second embodiment of the present invention. The control apparatus 1 in this embodiment is different from the first embodiment in that the resistance module PR further includes a first switch SW1, which is connected to a resistance 61 in series, and is connected with the variable resistance VR1 and the current limiting resistance RL in parallel. Accordingly, the operation of the first resistance 61 may be enabled/disabled by the provision of the first switch SW1. That is, the control apparatus 1 in this embodiment may switch between a modulation range of a large conduction angle set simply by the variable resistance VR1, and a modulation range of a smaller conduction angle after the first resistance 61 is connected in parallel. Therefore, this invention is applicable to various load situations of large conduction angle dimmer formed by the control apparatus 1 and small conduction angle dimmer of traditional leading edge cutoff dimmer.

Figure 4B:
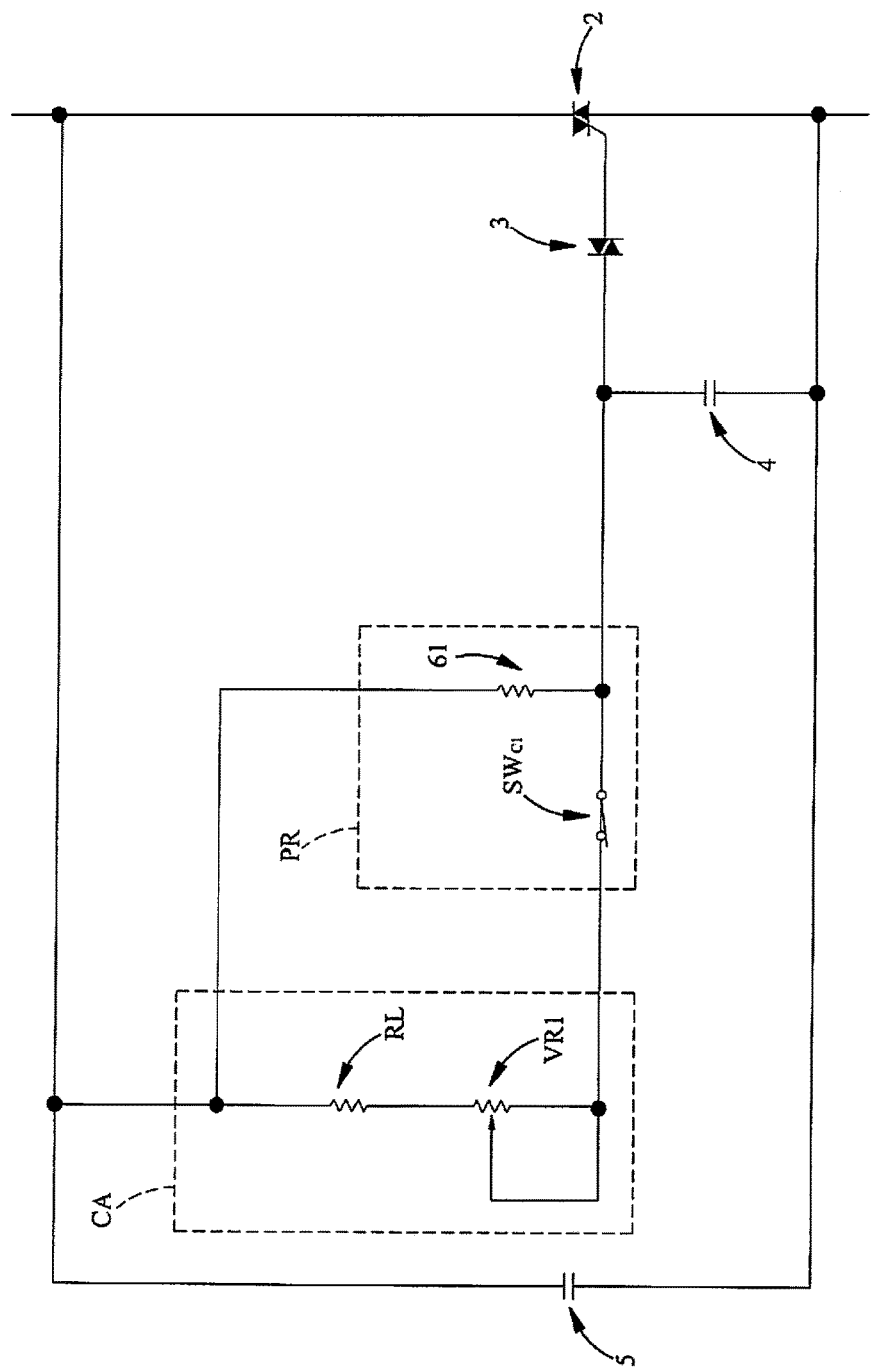
FIG. 4B is a circuit diagram of a control apparatus according to a third preferred embodiment of the present invention.

Referring to FIG. 4B which shows a circuit diagram of a control apparatus according to a third embodiment of the present invention. The control apparatus 1 in the third embodiment is different from the first embodiment in that the resistance module PR further includes a first always on push-button switch $SW_{C1}$, which is provided between the variable resistance VR1 of the conduction angle modulation module CA and the first resistance 61 of the resistance module PR. Accordingly, the conduction angle modulation module CA may be short out by pressing the first always on button switch $SW_{C1}$, and the conduction angle is determined by the first resistance 61 and changed to be a certain fixed value regardless of the setting of the conduction angle modulation module CA, to thereby serve as multiplexing control.

In other words, with the effect of the first always on push-button switch $SW_{C1}$, the resistance module PR in this embodiment may short out the conduction angle modulation module CA instantly, such that the capacitor is charged/discharged by solely the resistance module PR. At this instant, the conduction angle is smaller than the conduction angle that is modulated by the conduction angle modulation module CA. Besides, as the resistance of the resistance module PR is fixed, the conduction angle is also fixed. As such, uncertainty in the modulation range caused by different setting values due to switching of the variable resistance VR1 will not occur. As such, the circuit at the load end can be easily used to interpret the conduction angle, and the switching of other function modes can be easily arranged in order to achieve effect of multiplexing control.

Figure 5:
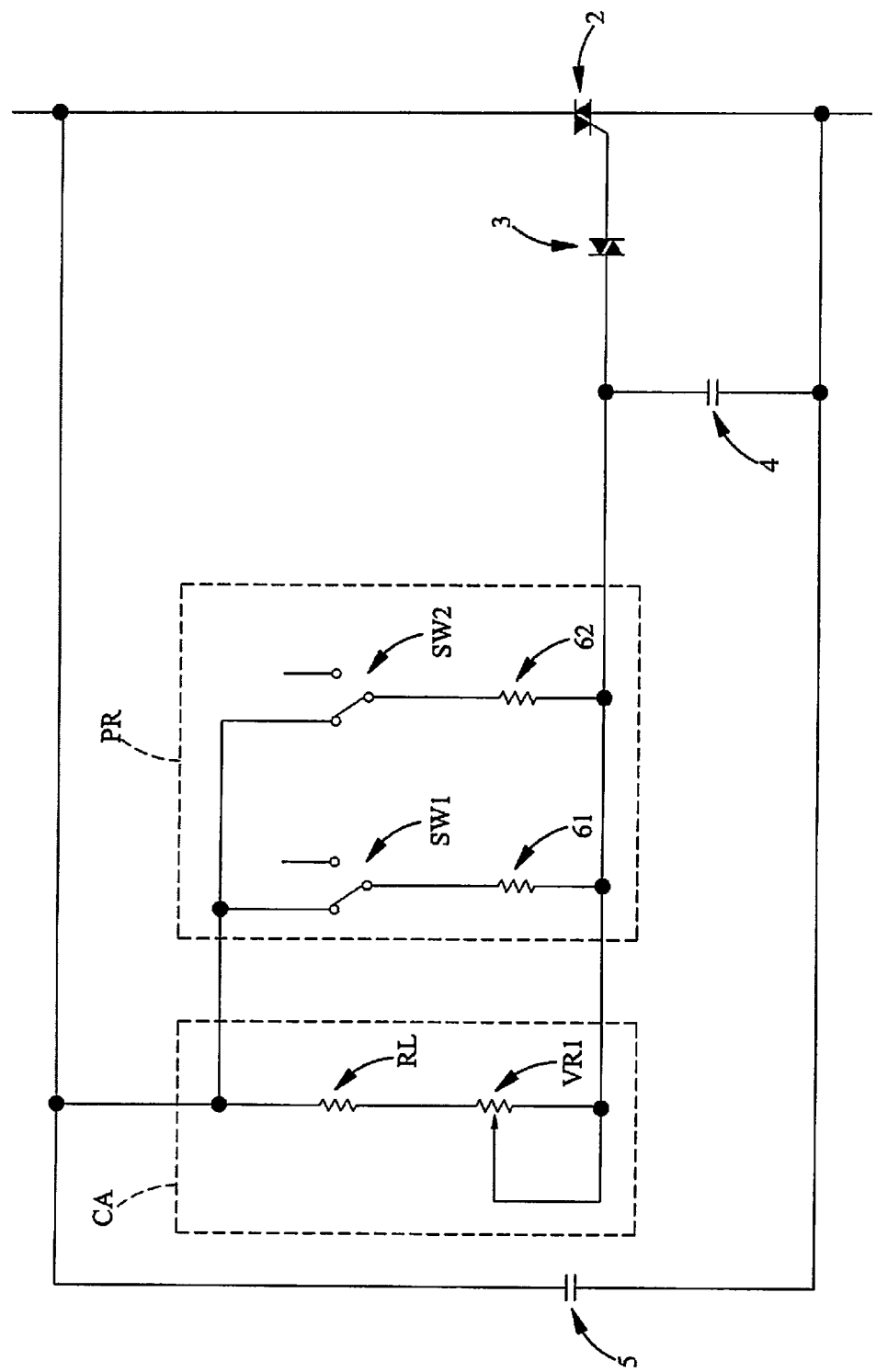
FIG. 5 is a circuit diagram of a control apparatus according to a fourth preferred embodiment of the present invention.

Referring to FIG. 5 which shows a circuit diagram of a control apparatus according to the fourth embodiment of the present invention. This embodiment is different from the second embodiment shown in FIG. 4A in that a second resistance 62 and a second switch SW2 in serial connection are arranged between the serially connected first resistance 61 and first switch SW1, and the diode thyristor 3. Likewise, the second resistance 62 and the second switch SW2 are connected in parallel with the first resistance 61 and the first switch SW1, and also in parallel with the variable resistance VR1 and the current limiting resistance RL. Accordingly, due to the provision of the second resistance 62 and the second switch SW2 in this embodiment, different conduction angle ranges may be set by switching the first switch SW1 and the second switch SW2.

Figure 6A:
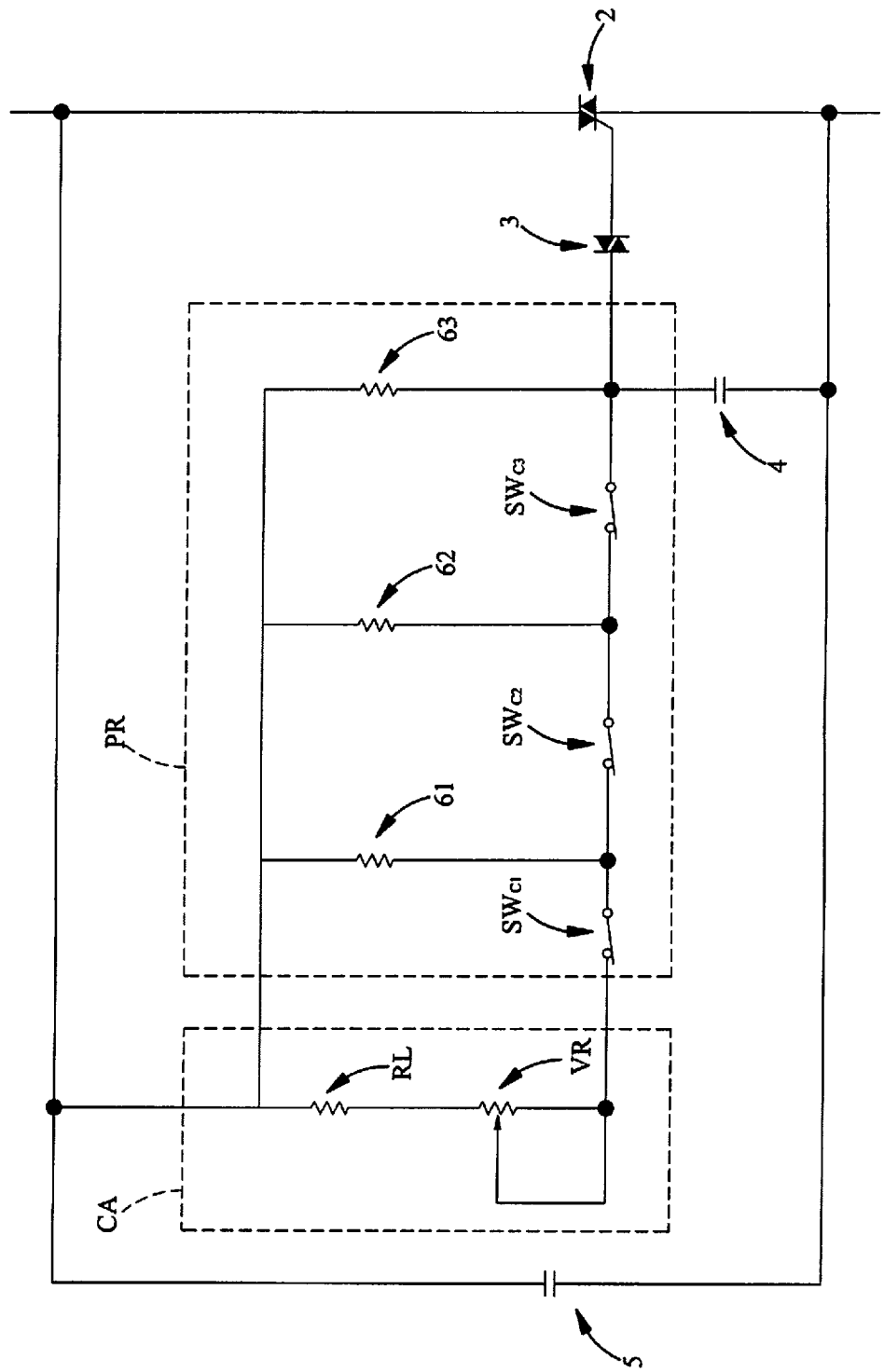
FIG. 6A is a circuit diagram of a control apparatus according to a fifth preferred embodiment of the present invention.

Referring to FIG. 6A which shows a circuit diagram of a control apparatus in the fifth embodiment according to the present invention. As shown in the figure, the resistance module PR includes a first resistance 61, a first always on push-button switch $SW_{C1}$, a second resistance 62, a second always on push-button switch $SW_{C2}$, a third resistance 63 and a third always on push-button switch $SW_{C3}$. The first resistance 61, the second resistance 62, the third resistance 63 and the variable resistance VR1 are connected in parallel with each other. The first always on push-button switch $SW_{C1}$ is provided between the variable resistance VR1 and the first resistance 61, the second always on push-button switch $SW_{C2}$ is provided between the first resistance 61 and the second resistance 62, and the third always on push-button switch $SW_{C3}$ is provided between the second resistance 62 and the third resistance 63.

When the first always on push-button switch $SW_{C1}$ is pressed, the conduction angle modulation module CA is short out. At this instant, the conduction angle of the dimmer is determined by the parallel resistivity of the first resistance 61, the second resistance 62 and the third resistance 63, and the conduction angle of the dimmer may be set to a fixed conduction angle which is smaller than the minimum conduction angle modulated by the conduction angle modulation module CA. Here, the setting of the conduction angle modulation module CA is irrelevant. In addition, the conduction angle modulation module CA and the first resistance 61 are short-out when the second always on push-button switch $SW_{C2}$ is pressed. Meanwhile, the conduction angle of the dimmer is determined by the parallel resistivity of the second resistance 62 and the third resistance 63, and the conduction angle of the dimmer may be set to a fixed conduction angle which is smaller than the minimum conduction angle at which the first always on push-button switch $SW_{C1}$ is short out, and which is irrelevant to the settings of the conduction angle modulation module CA and the first resistance 61. Furthermore, the conduction angle modulation module CA, the first resistance 61 and the second resistance 62 are short out when the third always on push-button switch $SW_{C3}$ is pressed. At this instant, the conduction angle is determined solely by the resistivity of the third resistance 63, and may be set to a fixed conduction angle which is smaller than the conduction angle at which the second always on push-button switch $SW_{C2}$ is short out, which is irrelevant to the settings of the conduction angle modulation module CA, the first resistance 61 and the second resistance 62.

Accordingly, in the fifth embodiment according to the present invention, by the provisions of three resistances, namely the first resistance 61, the second resistance 62 and the third resistance 63, and three switches, namely the first always on push-button switch $SW_{C1}$, the second always on push-button switch $SW_{C2}$ and the third always on push-button switch $SW_{C3}$, it is possible to modulate three fixed conduction angles besides the modulation range of the variable resistance VR, and thus three additional functional settings are possible.

Figure 6B:
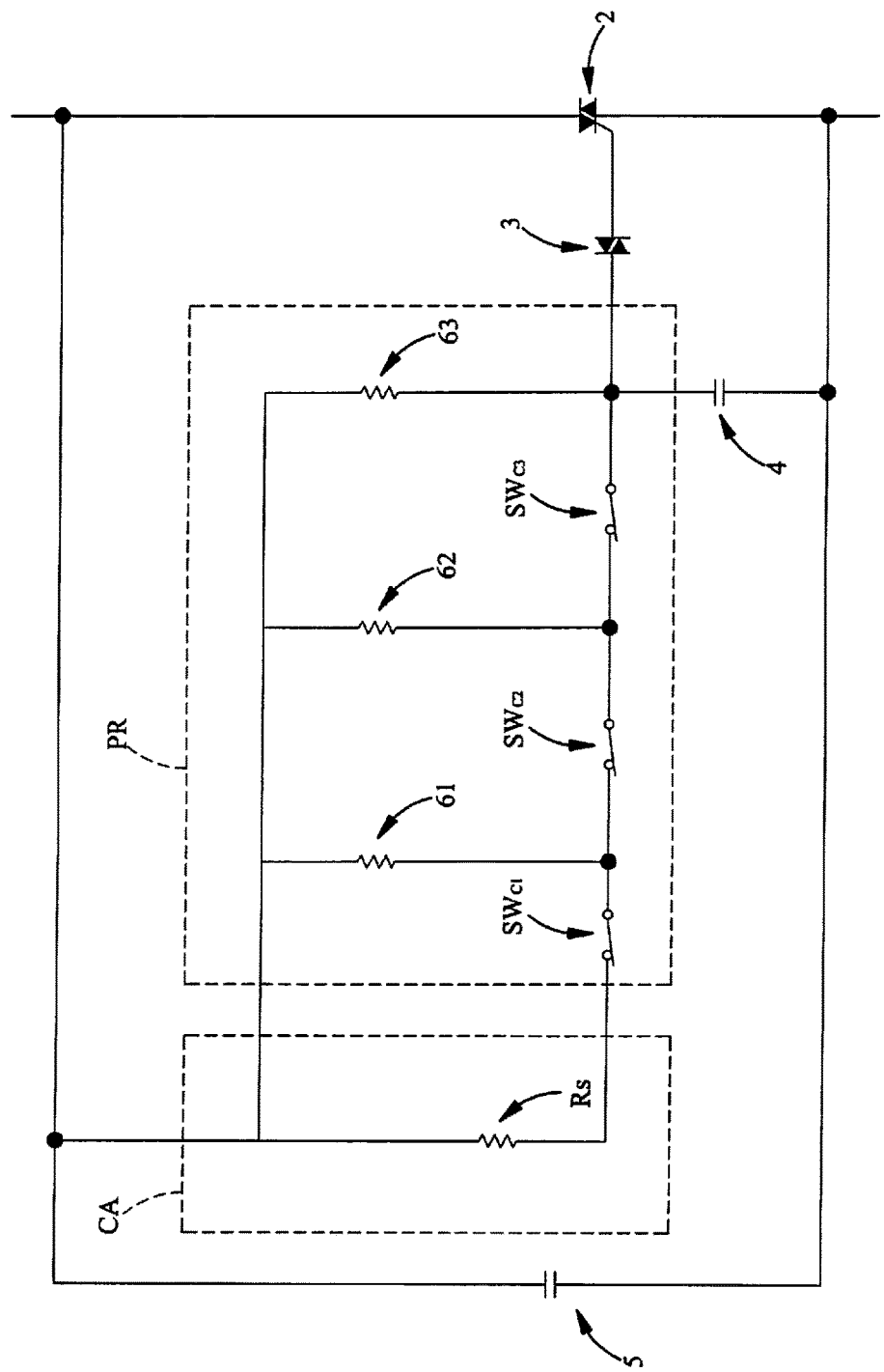
FIG. 6B is a circuit diagram of a control apparatus according to a sixth preferred embodiment of the invention.

Referring to FIG. 6B which shows a circuit diagram of a control apparatus according to the sixth embodiment of the present invention. The sixth embodiment is different from the fifth embodiment of FIG. 6A in that the conduction angle modulation module CA in this embodiment uses only a fixed resistance Rs. Each of the always on push-button switch in this embodiment functions like a key on a remote controller. Pressing different keys will instantly generate different conduction angles for control.

Figure 7:
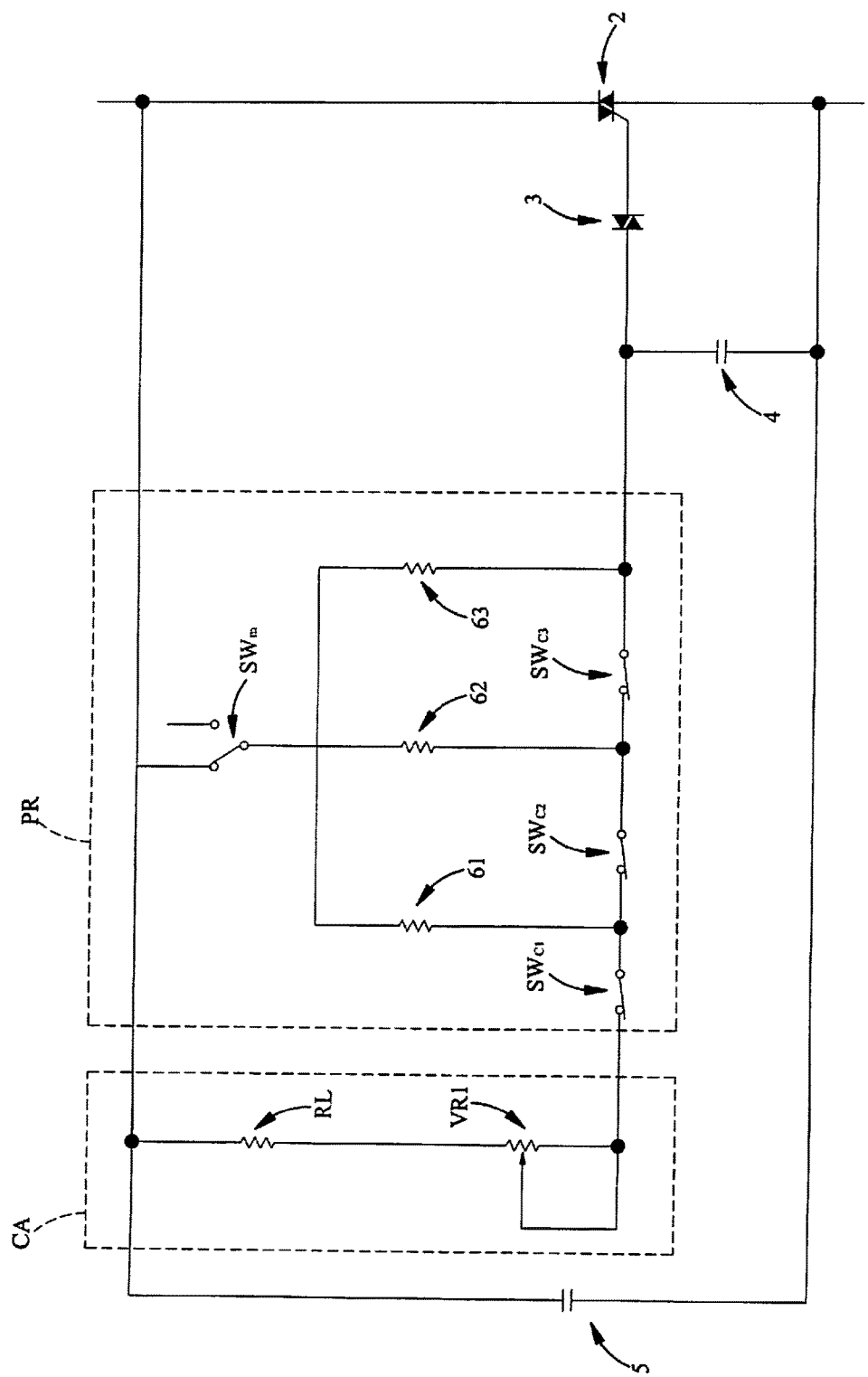
FIG. 7 is a circuit diagram of a control apparatus according to a seventh preferred embodiment of the invention.

Referring to FIG. 7 which shows a circuit diagram of a control apparatus according to the seventh embodiment of the present invention. The embodiment shown in FIG. 7 is different from the fifth embodiment shown in FIG. 6A in that the seventh embodiment further includes a mode switching switch $SW_m$. The mode switching switch $SW_m$ is used to make switches between the modulation range of the conduction angle for traditional leading edge cutoff dimmer of the separate variable resistance VR1, and the range of the large conduction angle and having multiplexing switch after resistances are connected in parallel. In other words, this embodiment not only provides modulation functions for small conduction angle affordable by conventional variable resistance alone, but also provides multi-functional modulation affordable by multiple switches by means of the mode switching switch $SW_m$.

In detail, the resistance module PR of this embodiment includes essentially a first resistance 61, a first always on push-button switch $SW_{C1}$, a second resistance 62, a second always on push-button switch $SW_{C2}$, a third resistance 63, a third always on push-button switch $SW_{C3}$ and a mode switching switch $SW_m$; wherein the first resistance 61, the second resistance 62 and the third resistance 63 that are connected in parallel are connected in series with the mode switching switch $SW_m$, and then connected in parallel with the variable resistance VR1. The first always on push-button switch $SW_{C1}$ is provided between the variable resistance VR1 and the first resistance 61, the second always on push-button switch $SW_{C2}$ is provided between the first resistance 61 and the second resistance 62, and the third always on push-button switch $SW_{C3}$ is provided between the second resistance 62 and the third resistance 63.

Additionally, determination means for misjudgement are provided for this embodiment. In particular, to avoid misjudgement due to power fluctuation and unstable power, the control unit 9 is designed to monitor the voltage of AC power supply simultaneously, and only when the instantaneous changes of the fixed conduction angle occur consecutively at least two times before it is confirmed that a particular always on push-button switch shall be pressed to execute a corresponding command.

While the preferred embodiments have been described as above, it is noted that the preferred embodiments are not restrictive to the scope of implementation of the present invention. Modifications and variations may be made without departing from the scope of the claims of the present invention.

What is claimed is:

1. A control apparatus using variations in conduction angle as control command, the control apparatus being configured to cut off a conduction angle of an AC power supply as a control command for controlling a load, comprising:
   a conduction angle modulation module for setting the conduction angle of the AC power supply; and
   a resistance module connected in parallel with the conduction angle modulation module, the resistance module being adapted to diminish the modulation range of the conduction angle that acts as the control command, wherein the load includes a phase detection circuit electrically connected to the control apparatus, the phase detection circuit being configured to detect the conduction angle of the AC power supply cut off by the control apparatus.

2. The control apparatus according to claim 1, wherein the conduction angle modulation module set the conduction angle of the AC power supply by a variable resistance.

3. The control apparatus according to claim 1, wherein the resistance module comprises a first resistance and a first switch, the first switch being coupled to the first resistance at one end and to the conduction angle modulation module at the other end.

4. The control apparatus according to claim 3, wherein the first switch is a change-over switch connected in series with the first resistance, and is connected in parallel with the conduction angle modulation module with the first resistance combined therewith.

5. The control apparatus according to claim 4, wherein the resistance module further comprises at least one second resistance and at least one second switch, the at least one second switch is a change-over switch, the at least one second resistance is connected in series with the at least one second switch, and connected in parallel with the conduction angle modulation module, and the second switch is connected in parallel with the first resistance and the first switch.

6. The control apparatus according to claim 3, wherein the first switch is a first always on push-button switch; one end of the first resistance and the conduction angle modulation module are coupled to a gate terminal of a thyristor, the other end of the first resistance and the conduction angle modulation module are coupled to an anode terminal of the thyristor; the first always on push-button switch is arranged between the one end of the first resistance and the one end of the conduction angle modulation module that are coupled to the gate terminal of the thyristor.

7. The control apparatus according to claim 6, wherein the first resistance is arranged between the conduction angle modulation module and the thyristor.

8. The control apparatus according to claim 7, wherein the resistance module further comprises at least one second always on push-button switch and at least one second resistance; the at least one second resistance and the first resistance are in parallel with each other, and are arranged between the first resistance and the thyristor; the at least one second always on push-button switch is coupled with the first always on push-button switch, and is provided between the first resistance and the second resistance, or between two of the second resistances arranged in parallel and adjacent to each other.

9. The control apparatus according to claim 8, wherein the resistance module further comprises a mode switching switch; the first resistance is arranged to connect with the at least one second resistance in parallel, and then connect with the mode switching switch in series, and subsequently connect in parallel with the end of the conduction angle modulation module that is not coupled to the first always on push-button switch.

10. The control apparatus according to claim 1, wherein the load further comprises:
a rectification circuit electrically connected to the control apparatus to rectify the cutoff alternating current (AC) from the AC power supply;
a bleeder circuit electronically connected to the rectification circuit and provided with a triode thyristor to prevent the triode thyristor from false firing; and
a control unit arranged to control at least one electrical appliance according to the detected conduction angle of the AC power supply cut off by the control apparatus.

11. The control apparatus according to claim 1, wherein the phase detection circuit comprises a zero-crossing detection circuit.

12. The control apparatus according to claim 1, wherein the load further comprises at least one control unit and at least one electrical appliance; the at least one control unit is electrically connected to the phase detection circuit and the at least one electrical appliance; wherein the at least one control unit is configured to control the at least one electrical appliance according to the detected conduction angle of the AC power supply cut off by the control apparatus.

13. The control apparatus according to claim 12, wherein tree at least one electrical appliance is selected from at least one in the group consisting of a DC inverter motor, at least a lamp and a heating apparatus.

14. A control terminal using variations in conduction angle of an AC power supply to control a load, comprising:
a control apparatus configured to cut off a conduction angle of the AC power supply, the control apparatus comprising a conduction angle modulation circuit for setting the conduction angle of the AC power supply by a variable resistance, and a resistance circuit connected in parallel with the conduction angle modulation circuit and adapted to diminish the modulation range of the conduction angle that acts as a control command for controlling the load;
a phase detection circuit arranged to detect the conduction angle of the AC power supply; and
a control unit arranged to control the load of at least one electrical appliance according to the detected conduction angle of the AC power supply cut off by the control apparatus.

15. The control terminal according to claim 14, wherein the resistance circuit comprises a first resistance and a first switch, the first switch being coupled to the first resistance at one end and to the conduction angle modulation circuit at the other end.

16. The control terminal according to claim 15, wherein the first switch is a change-over switch connected in series with the first resistance, and is connected in parallel with the conduction angle modulation circuit with the first resistance combined therewith.

17. The control terminal according to claim 15, wherein the resistance circuit further comprises at least one second resistance and at least one second switch, the at least one second switch is a change-over switch, the at least one second resistance is connected in series with the at least one second switch, and connected in parallel with the conduction angle modulation circuit, and the second switch is connected in parallel with the first resistance and the first switch.

18. The control terminal according to claim 15, wherein:
the first switch is a first always on push-button switch; one end of the first resistance and the conduction angle modulation circuit are coupled to a gate terminal of a thyristor, the other end of the first resistance and the conduction angle modulation circuit are coupled to an anode terminal of the thyristor; the first always on push-button switch is arranged between the one end of the first resistance and the one end of the conduction angle modulation circuit that are coupled to the gate terminal of the thyristor; and
the first resistance is arranged between the conduction angle modulation circuit and the thyristor.

19. The control terminal according to claim 18, wherein the resistance module further comprises:
at least one second always on push-button switch and at least one second resistance; the at least one second resistance and the first resistance are in parallel with each other, and are arranged between the first resistance and the thyristor; the at least one second always on push-button switch is coupled with the first always on push-button switch, and is provided between the first resistance and the second resistance, or between two of the second resistances arranged in parallel and adjacent to each other; and
a mode switching switch,
wherein the first resistance is arranged to connect with the at least one second resistance in parallel, and then connect with the mode switching switch in series, and subsequently connect in parallel with the end of the conduction angle modulation module that is not coupled to the first always on push-button switch.

20. The control terminal according to claim 14, further comprising:

a rectification circuit electrically connected to the control apparatus to rectify the cutoff alternating current (AC) from the AC power supply; and a bleeder circuit electrically connected to the rectification circuit and provided with a triode thyristor to prevent the triode thyristor from false firing, wherein the control unit is arranged to control at least one electrical appliance according to the detected conduction angle of the AC power supply cut off by the control apparatus.

* * * * *